United States Patent [19]

Peterson et al.

[11] Patent Number: 4,696,806

[45] Date of Patent: Sep. 29, 1987

[54] METAL HYDRIDE ADSORPTION PROCESS FOR HYDROGEN PURIFICATION

[75] Inventors: Janice C. Peterson, Allentown; Stephen P. DiMartino, Topton, both of Pa.

[73] Assignee: Air Products and Chemicals, Inc., Allentown, Pa.

[21] Appl. No.: 849,660

[22] Filed: Apr. 9, 1986

[51] Int. Cl.[4] .............................................. C01B 1/32
[52] U.S. Cl. ................................. 423/248; 423/648 R
[58] Field of Search ........................... 423/648 R, 248

[56] References Cited

U.S. PATENT DOCUMENTS

| | | | |
|---|---|---|---|
| 3,793,435 | 2/1974 | Reilly et al. | 423/248 |
| 4,079,523 | 3/1978 | Sandrock | 34/15 |
| 4,096,639 | 6/1978 | Sandrock | 34/15 |
| 4,096,641 | 6/1978 | Sandrock | 34/15 |
| 4,108,605 | 8/1978 | Billings | 23/252 |
| 4,133,426 | 1/1979 | Turillon et al. | 206/0.7 |
| 4,134,490 | 1/1979 | Turillon et al. | 206/0.7 |
| 4,134,491 | 1/1979 | Turillon et al. | 206/0.7 |
| 4,135,621 | 1/1979 | Turillon et al. | 206/0.7 |
| 4,360,505 | 11/1982 | Sheridan, III et al. | 423/248 |

Primary Examiner—John Doll
Assistant Examiner—Wayne A. Langel
Attorney, Agent, or Firm—Mark L. Rodgers; E. Eugene Innis; James C. Simmons

[57] ABSTRACT

The present invention is a process for recovering hydrogen from a hydrogen-containing feed stream using a metal hydride adsorption cycle. The adsorption cycle utilizes at least six separate metal hydride adsorption beds, and has been expanded over conventional adsorption cycles to include several additional process steps. Each of the separate beds successively undergoes adsorption, first equalization, rinse or second equalization, desorption, repressurization with rinse effluent, repressurization with equalization effluent and final repressurization with feed gas.

16 Claims, 2 Drawing Figures

FIG. I

METAL HYDRIDE ADSORPTION PROCESS FOR HYDROGEN PURIFICATION

TECHNICAL FIELD OF THE INVENTION

The present invention relates to a process for recovering a purified hydrogen product from a hydrogen-containing gas stream by adsorption of hydrogen onto a metal hydride bed.

BACKGROUND OF THE INVENTION

Conventional metal hydride adsorption systems for producing a hydrogen-rich product from a hydrogen-containing feed gas consist of four adsorption beds and four cycle steps. The four cycle steps are: adsorption, rinsing, depressurization, and repressurization. In such a system, a feed gas enters the vessel currently on line for the adsorption step at a certain temperature and pressure dependent upon the front end operations necessary to reduce the "poison" concentrations in the feed gas. The adsorption step continues until the tail gas; i.e. feed effluent, composition is equal to the feed composition, indicating that the adsorption capacity of the bed has been achieved. The tail gas from the first vessel is subsequently used to repressurize the adsorbent bed in a different vessel which has just completed the depressurization step.

The adsorbent bed in the first vessel now consists of metal hydride onto which pure hydrogen has been adsorbed and also gas of equal composition to the feed gas located in the void space of the bed and vessel. The rinsing step is then carried out using product hydrogen to displace the feed gas in the voids. This reduces the amount of impurities that will be present during the subsequent depressurization step. Since the pressure of the rinse gas should be approximately that of the feed gas and the product gas is at some reduced pressure, rinse compression is necessary.

After the rinse step has been completed; i.e. rinse effluent concentration is equal to product concentration, the bed is depressurized to some optimum pressure, dependent upon both the mole fraction of hydrogen in the feed gas and the feed pressure. Product hydrogen is drawn off and the bed is subsequently repressurized using tail gases from another vessel on line. This entire four step process is then repeated.

Several variations of this basic type of metal hydride adsorption process have been disclosed. Reilly, et al. U.S. Pat. No. 3,793,435 discloses a process for separating hydrogen from other gaseous products such as $O_2$, $N_2$, $CO$, $CO_2$, $H_2O$, and $CH_4$. Separation is achieved by contacting the gas mixture with a distributed form of an alloy of a rare earth lanthinum and nickel in an active state, the metal forming a hydride on contact with the hydrogen. Hydrogen separation is effected by passing a gas mixture at an initial pressure of 175 psia through a tubular reactor containing an inert, high porosity packing to prevent agglomeration at room temperature, removing an effluent gas at a pressure of 116–133 psia and then desorbing by reducing the pressure to 25 psia.

Billings, U.S. Pat. No. 4,108,605 discloses a process for treating a mixture of hydrogen and impurity gases by passing the gas mixture to a hydride container where the hydrogen is absorbed by the hydride forming material. To facilitate absorption and release of the hydrogen and impurities from the hydride forming material, a cooling fluid pump and heat exchanger and a heating fluid pump and heat exchanger are provided.

Sandrock, et al., in U.S. Pat. Nos. 4,079,523; 4,096,639; and 4,096,641 disclose various hydridable alloys which are suited for recovering hydrogen from a gas stream.

Turillon, et al., in U.S. Pat. Nos. 4,135,621; 4,134,490; 4,134,491 and 4,133,426 disclose the use of specially extended particles of solid having low apparent density distributed within a mass of metal hydride as a system for storing hydrogen. Mixtures of hydridable metal and particulate solids, i.e. metal powders such as nickel powder, are added to the hydrogen storage vessel. Also disclosed are the use of dry diatomaceous earth, lining, and metal whiskers in the powder combined to provide a packing density of not greater than 30% of the theoretical density of the powder itself. Additionally, the U.S. Pat. No. 4,134,491 discloses the use of collapsible structures.

Sheridan, et al. U.S. Pat. No. 4,360,505 discloses an improved adiabatic process for separating hydrogen from mixed gas streams using hydridable materials as the absorbing medium. The improvement involves utilizing a composite comprising a thermal ballast in admixture with the hydride material to absorb the heat of the reaction and to aid in desorption. By virtue of the intimate contact of the ballast with the hydridable material, rapid cycle times plus good bed utilization are achieved.

BRIEF SUMMARY OF THE INVENTION

The present invention is a process for recovering hydrogen from a feed stream containing hydrogen and at least one other component by a metal hydride adsorption process utilizing at least six separate metal hydride beds. In the first step of the adsorption cycle, a hydrogen containing feed stream is passed over a first metal hydride bed whereby a portion of the hydrogen contained in the feed stream is adsorbed by the first bed. The pressure of the first bed is then equalized with another metal hydride bed in the cycle which is undergoing repressurization. The first bed is rinsed with a hydrogen-rich stream and subsequently depressurized to a pressure sufficient to desorb the hydrogen from the metal hydrides, thereby producing a hydrogen-rich stream. After the hydrogen is removed from the metal hydrides, the first bed is repressurized by contacting it with effluent streams produced during the equalization and rinse steps of subsequent metal hydride beds in the cycle. The first bed is further repressurized using the hydrogen-rich feed gas to bring the bed up to adsorption pressure.

The above-described process cycle is carried out for each of the separate metal hydride beds such that the start of the adsorption step is staggered between successive beds by about one-half the total adsorption time.

Expansion of the standard four-bed, four step conventional adsorption cycle to include at least six adsorption beds using the above-described cycle, results in a more efficient and cost effective process for recovering hydrogen. The pressure equalization step results in a decrease in product compression requirements due to the reduction in rinse volume being compressed along with the product, as well as the reduced pressure at which the rinsing occurs. Additionally, work can be recovered through expansion of the high pressure tail gas and applied to product compression, resulting in up to 56% power reduction for the present process.

DETAILED DESCRIPTION OF THE INVENTION

Use of conventional, four bed metal hydride adsorption processes for the recovery of hydrogen have not proved to be cost competitive with other conventional methods such as pressure swing adsorption, cold box and membrane separation. The major limitations of the four bed metal hydride systems are product compression costs, rinse compression costs, and resistivity of the hydride adsorbent to poisons. In the adsorption process, hydrogen is rejected at a pressure considerably lower than other hydrogen recovery techniques, resulting in large product and rinse compression requirements.

The present invention is an improved metal hydride adsorption process which overcomes many of the limitations of the conventional cycle. In order to reduce the product/rinse compression requirements of the standard process, the present process includes seven process steps utilizing at least six metal hydride beds. The seven process steps include:

(1) adsorption
(2) first equalization
(3) second equalization or rinse
(4) desorption
(5) repressurization with effluent from step (3)
(6) repressurization with effluent from step (2)
(7) repressurization with feed gas.

Figure 1:
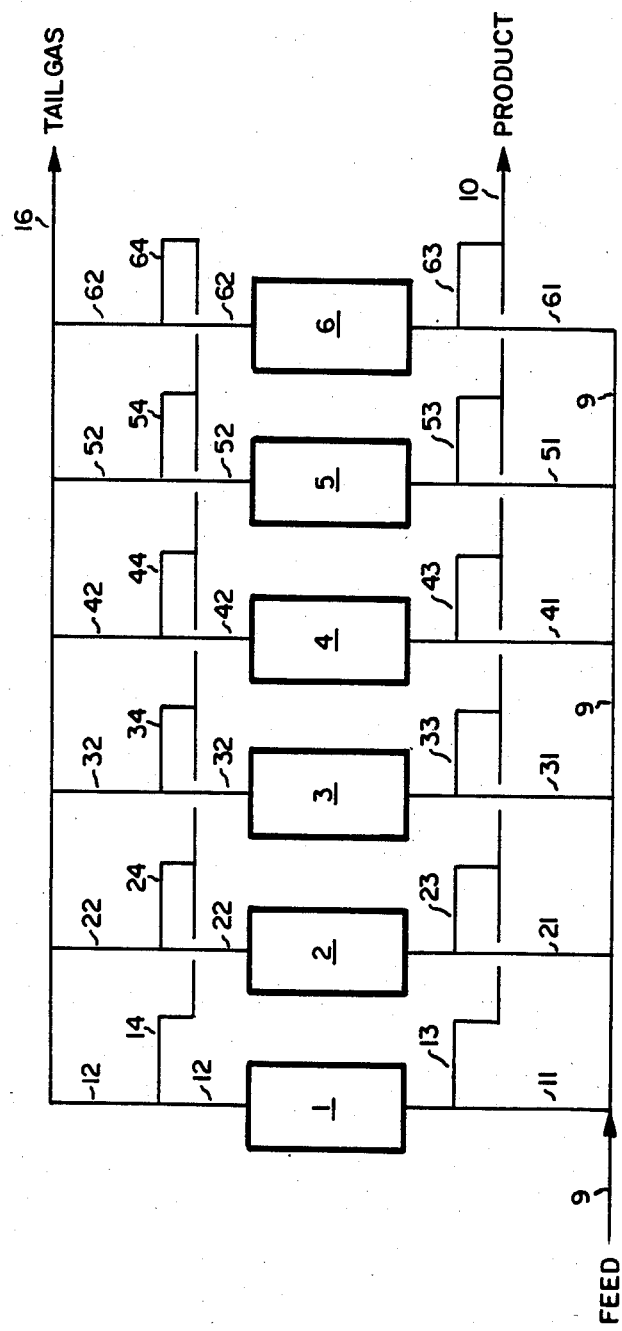
FIG. 1 is a flow diagram of one embodiment of the present invention wherein the process cycle has two equalization steps.

Referring to the drawing of FIG. 1, a feed stream 9 containing hydrogen and at least one other component, such as Catalytic Reformer Off-gas or Refinery Off-gas, enters a first metal hydride containing vessel 1 through conduit 11. Typically, the metal hydride bed comprises hydridable alloys of at least two elements selected from the group consisting of iron, titanium, nickel, calcium, manganese, magnesium and rare earth metals. As the feed gas passes through vessel 1 the hydrogen in the feed is adsorbed onto the metal hydride bed and the remaining tail gas exits at the top of vessel 1 through conduit 12 at essentially feed gas pressure. Feed gas is passed through vessel 1 until the adsorptive capacity of the hydride is complete; i.e. when the composition of the tail gas is equal to the composition of the feed gas. Typically the adsorption time is about one-third of the entire cycle time.

When adsorption is complete, the bed is equalized in pressure with the hydride bed in vessel 4 which is being repressurized. During this equalization step, a gas stream containing at least some hydrogen exits vessel 1 via conduit 12, is passed through conduit 14 and subsequently enters vessel 4 via conduits 44 and 42. In this manner the hydrogen that is released in the flash from vessel 1 is recovered by adsorption during repressurization in vessel 4. Additionally, it is not a requirement that the rinse gas for the subsequent steps be at adsorption pressure, but rather must only be compressed to flash pressure, thus saving power in recompression.

The hydride bed in vessel 1 is then equalized in pressure with the bed in vessel 5 which has just completed the desorption step. During equalization a gas stream containing some hydrogen exits at the top of vessel 1 via conduit 12 from which it enters conduit 14. The gas stream then flows through conduit 14 and into conduits 54 and 52 from which it enters vessel 5.

After both equalization steps are complete, the hydride bed in vessel 1 is depressurized to desorption pressure to produce a purified hydrogen product. The hydrogen adsorbed on the metal hydride bed is released during depressurization and exits vessel 1 through conduit 11 and into conduit 13 and is subsequently recovered as product stream 10. The hydrogen product stream 10 typically has a hydrogen concentration of at least 80% and preferably at least 97%. The hydrogen product typically exits the vessel 1 at a pressure between 15 and 100 psia and, depending upon the subsequent intended use, may be compressed to higher pressures; e.g. typically between 800 and 2000 psia. In the case of a six bed operation, only one bed is depressurized at a time for a time span equal to about one-half adsorption time or one-sixth of the entire cycle time. The desorption step is followed by a short lag time; e.g. about one-fifteenth of the entire cycle time, during which no activity occurs in the bed.

The desorption step is followed by repressurization of the bed with rinse or equalization effluent exiting vessel 3. The effluent exits vessel 3 via conduit 32, and subsequently enters and flows through conduits 34 and 14, and finally enters vessel 1 through conduit 12. After a short representation; i.e. about one-twelfth total cycle time, with effluent from vessel 3, vessel 1 is further repressurized with equalization effluent from vessel 4. The effluent from the equalization step of vessel 4 exits through conduit 42, is passed through conduit 44 to conduit 14 where it flows to conduit 12 and into vessel 1. The second repressurization step is also about one-twelfth of the total cycle time.

The final step in the cycle is repressurization with feed gas. The feed stream 9 enters vessel 1 through conduit 11 and is prevented from existing the top of vessel 1 until the hydride bed pressure is increased to adsorption pressure. After the bed reaches adsorption pressure; typically between 100 and 1000 psig, the feed is allowed to flow through the vessel 1 for adsorption of hydrogen, thus beginning a new cycle.

In this embodiment, two successive equalization steps are carried out instead of an equalization step followed by a rinse step. By eliminating the rinse step in this case, the need for a rinse compressor is eliminated.

The flow of gases through the various conduits in this process can be controlled by any suitable flow regulation means, such as by conventional flow valves, three-way valves, gate valves, etc.

The seven-step cycle described above requires at least six separate hydride beds, and can be expanded to include as many additional beds as is feasible. The seven process steps are repeated for each metal hydride bed in the system, and operated such that the start of the adsorption step is staggered between successive beds by about one-half the total adsorption time. Each bed produces a hydrogen product stream during the desorption step of the cycle; i.e. hydrogen product streams exit vessels 1–6 through conduits 13, 23, 33, 43, 53, and 63 respectively, with the hydrogen product being collected and recovered either as separate streams or as a single product stream 10. Additionally, during the adsorption step of the cycle, a hydrogen-lean tail gas is exhausted from vessels 1–6 through conduits 12, 22, 32, 42, 52, and 62 respectively. The tail gas can be exhausted or recovered separately or collectively as stream 16.

During the operation of this process, at least two separate hydride beds are adsorbing at the same time staggered by one-half the adsorption time, thus increasing the adsorption capacity and reducing metal hydride costs. In addition to the potential savings in hydride costs, the introduction of the equalization steps produce a savings in production compression, both capital and operating, costs. These savings are due to the reduction in rinse volume being compressed along with the product, as well as the reduced pressure at which the equalization step occurs. A savings of 5% to 20% is realized in capital costs and 2% to 21% in operating costs, over that of the standard four step cycle, within increased savings corresponding to decreased rinse volume.

Table 1 below illustrates the process steps and relative times for each step for a six bed process described above. The table utilizes twelve segments to cover the seven separate steps so that the relative times for each step can be clearly indicated.

psia. The hydrogen rinse stream is optionally passed to a rinse scrub drum 17, where it undergoes a scrubbing operation to remove impurities and is subsequently passed via conduit 15 to conduit 11 where it enters vessel 1 for rinsing the hydride bed. The gas in the voids of the hydride bed which has been displaced by the rinse gas is used to repressurize a bed on line which has just completed the desorption step; i.e. vessel 5 in the scheme shown in FIG. 2. Together the rinse and equalization steps require about one-sixth of the total cycle time, with equalization utilizing about 40% of this time and rinsing utilizing about 60%.

After the rinse step is complete, the bed in vessel 1 is depressurized to desorption pressure to produce a hydrogen-rich stream, which exits vessel 1 via conduits 11, is passed to conduit 13, and is finally collected as a hydrogen-rich product stream 10. Only one bed in the present six bed system is depressurized at a time for a time span equal to about one-half adsorption time or about one-sixth of the entire cycle time. As with the previously described embodiment, desorption is fol-

TABLE 1

| BED | STEP 1 | 2 | 3 | 4 | 5 | 6 | 7 | 8 | 9 | 10 | 11 | 12 |
|---|---|---|---|---|---|---|---|---|---|---|---|---|
| 1 |  | ADSORB |  |  | EQ1 | EQ2 | DESORB |  |  | REP1 | REP2 | REP3 |
| 2 | REP2 | REP3 |  | ADSORB |  |  | EQ | EQ2 | DESORB |  |  | REP1 |
| 3 |  | REP1 | REP2 | REP3 |  | ADSORB |  |  | EQ | EQ2 |  | DESORB |
| 4 | DESORB |  |  | REP1 | REP2 | REP3 |  | ADSORB |  |  | EQ | EQ2 |
| 5 | EQ |  | EQ2 | DESORB |  |  | REP1 | REP2 | REP3 |  | ADSORB |  |
| 6 | ADSORB |  | EQ | EQ2 |  | DESORB |  | REP1 | REP2 | REP3 |  | ADSORB |

Figure 2:
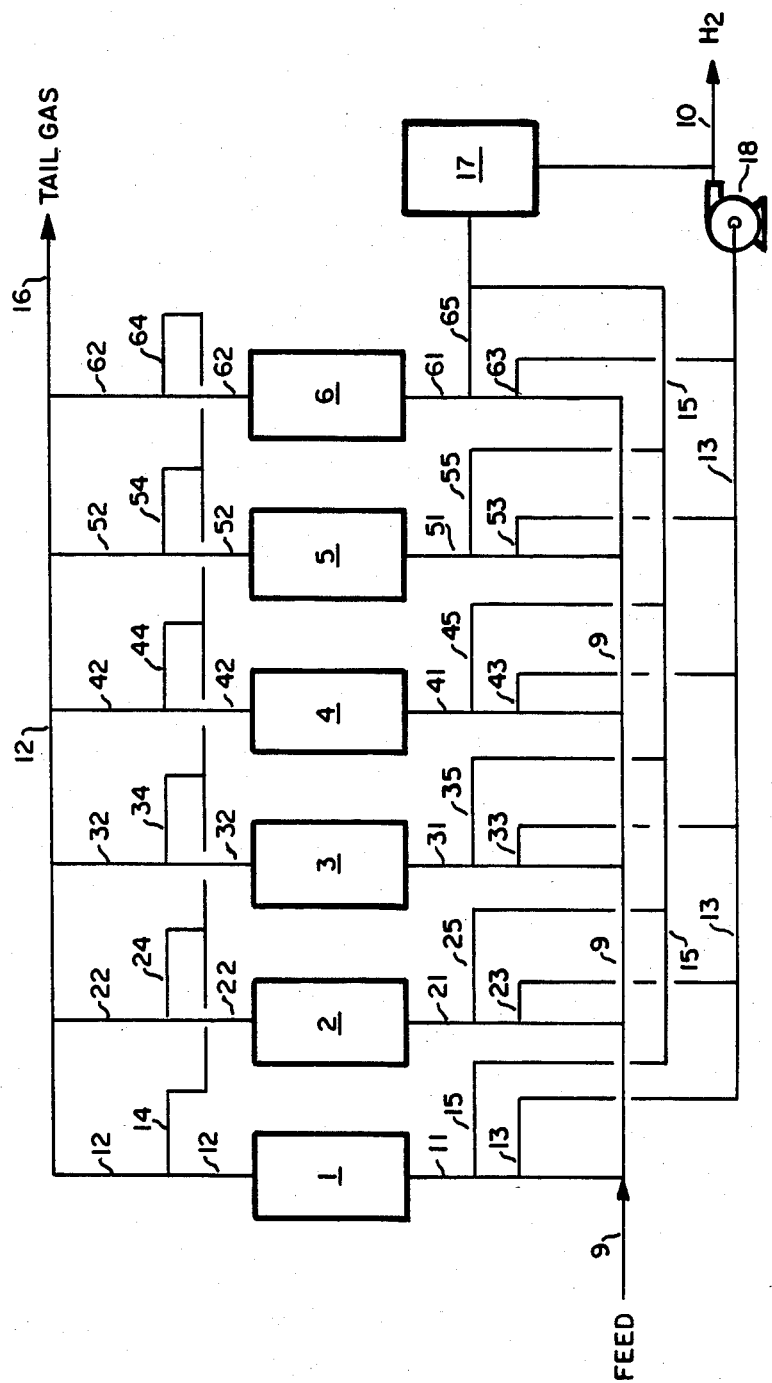
FIG. 2 is a flow diagram of one embodiment of the present invention wherein the process cycle has one equalization and one rinse step.

A second embodiment of the present invention is represented by the drawing of FIG. 2. In this embodiment, a rinse step is used in place of the second equalization. Corresponding equipment, streams and conduits of FIGS. 1 and 2 are numbered the same.

Referring to FIG. 2, a hydrogen-containing feed stream 9 is introduced into a first metal hydride containing vessel 1 through conduit 11. As the feed stream 9 passes through vessel 1, the hydrogen contained in the feed is absorbed onto the metal hydride bed and the remaining tail gas exits at the top of vessel 1 through conduit 12 at essentially feed gas pressure. The feed gas is passed through vessel 1 until the adsorptive capacity of the metal hydride is complete. As with the embodiment in FIG. 1, the adsorption step in this embodiment also is about one-third of the entire cycle time.

When adsorption is complete the bed is equalized in pressure with the hydride bed in vessel 4 which is being repressurized. During this equalization step, a gas stream containing at least some hydrogen exits vessel 1 via conduit 12, is passed through conduit 14 to conduit 44 and subsequently enters vessel 4 through conduit 42. In this manner the hydrogen that is released in the flash is recovered by adsorption during repressurization. This process does not require the rinse gas for the subsequent steps to be at absorption pressure, but rather it must only be compressed to flash pressure, thus saving significant power in recompression.

After the equalization step is completed, the bed in vessel 1 is rinsed with a certain volume of product gas; e.g. about 97% hydrogen, which displaces the same volume of gas present in the voids of the metal hydride bed. The product gas used for this rinse is hydrogen product which exits vessel 6 upon desorption via conduit 61 and is passed through conduit 63 to a compressor 18 where it is compressed to a pressure of about 100 lowed by a short lag time, about one-fifteenth of the entire cycle time, during which no activity occurs in the bed.

The desorption step is followed by repressurization of the hydride bed with the rinse effluent from vessel 3. This rinse effluent exits vessel 3 through conduit 31 from where it flows to conduits 35 and 15 and is respectively and is subsequently passed to vessel 1 through conduit 12. A second repressurization step is then carried out using the equalization effluent from the equalization step occurring in the hydride bed of vessel 4. The equalization effluent leaves vessel 4 via conduit 41 is passed to conduit 45 and enters conduit 15 where it flows to conduit 12 and subsequently enters vessel 1 to repressurized the hydride bed.

The final step in the process cycle is repressurization of the hydride bed in vessel 1 to adsorption pressure using the feed gas stream 9. The feed gas stream 9 enters vessel 1 via conduit 11 and is prevented from exiting vessel 1 until the pressure of the hydride bed is that needed for the adsorption step. When the metal hydride bed reaches adsorption pressure the hydrogen in the feed is adsorbed on to the hydride bed and the tail gas is vented from vessel 1 through conduit 12, thus beginning a new cycle.

As with the embodiment depicted in the drawing of FIG. 1, the flow of gases through the conduits in this scheme are controlled by some type of flow control means, such as flow control valves, three-way valves, gate valves, etc. The steps recited for the hydride bed in vessel 1 are repeated for all of the beds in the cycle, with the cycle requiring at least six beds to function properly, with any higher number of beds being possible. Again, the system is operated such that the start of the adsorption step is staggered between successive beds by about one-half the total adsorption time. The tail gas vented from the adsorption step of each bed through conduits 12, 22, 32, 42, 52, and 62 from vessels 1-6 respectively can be exhausted or collected individually or collectively as stream 16. Likewise, the desorption step produces a hydrogen product from vessel 1-6 during their respective desorption operations and the product is collected via conduits 11 and 13, 21 and 23, 31 and 33, 41 and 43, 51 and 53, and 61 and 63 to which they may be collected separately or combined in a single conduit 13 and collected as a single hydrogen-rich product stream 10.

Table 2 below illustrates the process steps and relative times for each step for a six bed process operated in accordance with the embodiment shown in the drawing of FIG. 2. The table utilizes 12 segments to cover the seven separate steps so that the relative times for each step can be clearly indicated.

TABLE 2

| | STEP | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | ADSORB | ADSORB | | | EQ1 | RINSE | DESORB | DESORB | | RIN.REP | EQ | REP |
| 2 | EQ | REP | ADSORB | ADSORB | | | EQ | RINSE | DESORB | DESORB | RIN.REP | RIN.REP |
| 3 | | RIN.REP | EPQ | REP | ADSORB | ADSORB | | | EQ | RINSE | DESORB | DESORB |
| 4 | DESORB | DESORB | | RIN.REP | EQ | REP | ADSORB | ADSORB | | | EQ | RINSE |
| 5 | EQ | RINSE | DESORB | DESORB | | RIN.REP | EQ | REP | ADSORB | ADSORB | | |
| 6 | ADSORB | ADSORB | | EQ | RINSE | DESORB | DESORB | | RIN.REP | EQ | REP | ADSORB |

Expansion of the standard 4-step adsorption cycle to include 7 steps enables two beds to absorb simultaneously, staggered by one-half the adsorption time. A savings of up to 34% in adsorbent costs can be incurred, depending on the rinse and the rinse volume used. As rinse volume decreases, the amount of absorbent necessary increases for a fixed production rate. Additionally, work may be recovered through expansion of the high pressure tail gas produced from the adsorption step and applied to product compression. In this manner power requirements can be reduced by between 45% to 56% in the above process.

Having thus described the present invention what is now deemed appropriate for Letters Patent is set out in the following appended claims.

What is claimed is:

1. A process for recovering hydrogen from a feed stream containing hydrogen and at least one other gaseous component, said process comprising a metal hydride adsorption cycle utilizing at least six separate metal hydride beds wherein said cycle comprises the steps of:
   (a) passing the hydrogen-containing feed stream over a first metal hydride bed whereby a portion of the hydrogen contained in the feed is adsorbed by said first bed;
   (b) equalizing the pressure of the first bed with another metal hydride bed in the cycle which is undergoing repressurization;
   (c) rising said first bed with a hydrogen-rich stream;
   (d) depressurizing the first bed to a pressure sufficient to desorb the hydrogen from the metal hydrides, thereby producing a hydrogen-rich stream;
   (e) repressurizing the first bed by contacting it with effluent streams produced during the equalization and rinse steps of a subsequent metal hydride bed in the cycle;
   (f) further repressurizing the first bed to bring said bed to adsorption pressure; and
   (g) repeating steps (a) through (f) for each of the separate metal hydride beds such that the start of the adsorption step is staggered between successive beds by about one-half the total adsorption time.

2. The process in accordance with claim 1 wherein said feed stream is refinery off-gas.

3. The process in accordance with claim 1 wherein the metal hydride bed comprises hydridable alloys of at least two elements selected from the group consisting of iron, titanium, nickel, calcium, manganese, magnesium and rare earth elements.

4. The process in accordance with claim 1 wherein the adsorption pressure of the metal hydride bed is between about 100 and 1000 psia.

5. The process in accordance with claim 1 wherein the hydrogen-rich stream produced in step (d) has a hydrogen concentration of about 97%.

6. The process in accordance with claim 1 wherein the adsorption step is carried out for about one-third of the total cycle time.

7. The process in accordance with claim 1 wherein a high pressure hydrogen-lean tail gas is produced during the adsorption step.

8. The process in accordance with claim 7 wherein the high pressure hydrogen-lean tail gas is expanded to provide work for product compression.

9. A process for recovering hydrogen from a feed stream containing hydrogen and at least one other gaseous component, said process comprising a metal hydride adsorption cycle utilizing at least six separate metal hydride beds wherein said cycle comprises the steps of:
   (a) passing the hydrogen-containing feed stream over a first metal hydride bed whereby a portion of the hydrogen contained in the feed is absorbed by said first bed;
   (b) equalizing the pressure of the first bed with another metal hydride bed in the cycle which is undergoing repressurization;
   (c) equalizing the pressure of the first bed with another metal hydride bed in the cycle which has just completed desorption;
   (d) depressurizing the first bed to a pressure sufficient to desorb the hydrogen from the metal hydrides, thereby producing a hydrogen-rich stream;
   (e) repressurizing the first bed by contacting it with effluent streams produced during the equalization and rinse steps of a subsequent metal hydride bed in the cycle;
   (f) further repressurizing the first bed to bring said bed to adsorption pressure; and
   (g) repeating steps (a) through (f) for each of the separate metal hydride beds such that the start of the adsorption step is staggered between successive beds by about one-half the total adsorption time.

10. The process in accordance with claim 9 wherein said feed stream is refinery off-gas.

11. The process in accordance with claim 9 wherein the metal hydride bed comprises hydridable alloys of at least two elements selected from the group consisting of iron, titanium, nickel, calcium, manganese, magnesium and rare earth elements.

12. The process in accordance with claim 9 wherein the adsorption pressure of the metal hydride bed is between about 100 and 1000 psia.

13. The process in accordance with claim 9 wherein the hydrogen-rich stream produced in step (d) has a hydrogen concentration of about 97%.

14. The process in accordance with claim 9 wherein the adsorption step is carried out for about one-third of the total cycle time.

15. The process in accordance with claim 9 wherein a high pressure hydrogen-lean tail gas is produced during the adsorption step.

16. The process in accordance with claim 15 wherein the high pressure hydrogen-lean tail gas is expanded to provide work for product compression.

* * * * *